(12) United States Patent
Sloot

(10) Patent No.: US 6,752,892 B2
(45) Date of Patent: Jun. 22, 2004

(54) SYSTEM AND METHOD FOR RETAINING AND DISPLAYING PIECE OF MATERIAL

(75) Inventor: Alexander Sloot, Sugarloaf, PA (US)

(73) Assignee: Printmark Industries Inc., Hazleton, PA (US)

( * ) Notice: Subject to any disclaimer, the term of this patent is extended or adjusted under 35 U.S.C. 154(b) by 124 days.

(21) Appl. No.: 10/114,366

(22) Filed: Apr. 2, 2002

(65) Prior Publication Data
US 2003/0186011 A1 Oct. 2, 2003

(51) Int. Cl.[7] .................. B32B 31/18; B32B 31/20
(52) U.S. Cl. .............. 156/249; 156/251; 156/252; 156/253; 156/256; 156/267; 156/268; 156/275.1; 156/308.4
(58) Field of Search .................. 156/251, 247, 156/249, 250, 252, 253, 256, 257, 267, 268, 275.1, 308.4; 40/661.04, 661.05, 661.09; 428/40.1

(56) References Cited

U.S. PATENT DOCUMENTS

| | | | |
|---|---|---|---|
| 3,629,034 A | 12/1971 | Kuroda | |
| 3,629,035 A | 12/1971 | Kuroda | |
| 3,756,888 A | 9/1973 | Kuroda | |
| 3,758,358 A | 9/1973 | Kuroda | |
| 4,160,685 A | 7/1979 | Kuroda | |
| 4,209,354 A | 6/1980 | Kuroda | |
| 4,345,958 A | 8/1982 | Kuroda | |
| 5,009,943 A | 4/1991 | Stahl | |
| 5,251,337 A | 10/1993 | Sloot | |
| 5,411,783 A | 5/1995 | Mahn | |
| 5,622,587 A | 4/1997 | Barthelman | |
| 5,636,385 A | * 6/1997 | Harrison | 2/244 |
| 6,178,680 B1 | * 1/2001 | Sloot | 40/668 |
| 6,270,877 B1 | 8/2001 | Sloot | |
| 6,322,866 B1 | 11/2001 | Sloot | |

* cited by examiner

Primary Examiner—Melvin C. Mayes
(74) Attorney, Agent, or Firm—St. Onge Steward Johnston & Reens

(57) ABSTRACT

A system for retaining and displaying a piece of material is provided. The system includes an intermediate fixation system which is attached to the lower surface of the material. A lower layer is provided having an upper surface to which the material is affixed by the intermediate fixation system. The lower layer is sized such that the outer periphery thereof extends beyond the outer periphery of the material. An upper layer having an outer periphery sized such that it extends beyond the outer periphery of the material is sealed to the upper surface of the lower layer. The upper layer has an opening passing therethrough which is sized such that a portion of the upper layer surrounding the opening overlies and is sealed to the outer periphery of the piece of material on its upper surface. An adhesive layer is applied to the lower surface of the lower layer.

15 Claims, 6 Drawing Sheets

SYSTEM AND METHOD FOR RETAINING AND DISPLAYING PIECE OF MATERIAL

FIELD OF THE INVENTION

The present invention relates to a system for retaining and displaying a piece of material, and more specifically to a piece of fabric which in encapsulated with a specially adapted surround so that the fabric may be adhered to another member and be retained thereon without being damaged, such as by fraying, and a method of creating the same.

BACKGROUND OF THE INVENTION

Systems and methods for displaying pieces of material are known. Such systems and methods are often used, for example, to create appliqués on clothing or other fabric material. For example, U.S. Pat. No. 5,009,943 to Stahl provides an appliqué made of laminated fabric having stitching, an upper woven blank, and a lower woven blank that has a shape that is larger and complementary to the shape of the upper woven blank and of a contrasting color so that a contrasting color is visible on the lower blank attached to the garment. Similarly, U.S. Pat. No. 5,411,783 to Mahn provides thermoplastic pre-die cut designs with molded relief patterns, sublimation printing, and adhered layers. However, a disadvantage of the systems disclosed in these references is that the pieces of material are simply bonded together by stitching, adhesives or the like. As such, the edges of the pieces are exposed, and may become damaged or frayed with extended handling. Therefore, it is necessary that certain types of materials be used which are particularly tough and damage resistant, and the systems are not appropriate for all materials, such as standard clothing fabrics.

Appliqués and laminates which include trapped portions of foam are also known. U.S. Pat. Nos. 3,629,034, 3,629,035 and 4,160,685 to Kuroda disclose three-dimensional appliqués having a continuous plastic cover layer, an intermediate synthetic foam layer, outer and inner bonding zones creating a relief pattern, a support or base layer, and a severed borderline. U.S. Pat. No. 5,622,587 to Barthelman provides a decal having a cover layer, a foam intermediate layer and a substrate having a relief pattern with arcuate edges. However, the trapped foam in these systems is provided only to give a raised, three-dimensional appearance to the appliqué, and is not displayed.

Other systems are known which do trap and display a piece of material. For example, U.S. Pat. No. 6,270,877 to Sloot discloses an appliqué for applying to garments and the like, which includes a decoratively shaped perimeter and relief pattern, a plush layer having a pre-cut periphery, and a vinyl overlay encapsulating the periphery of the pre-cut plush layer. U.S. Pat. No. 6,322,866 to Sloot discloses an appliqué for garments having multiple layers, and a decoratively shaped perimeter and relief pattern having a relatively high profile and side wall being substantially perpendicular to the plain in which the raised and lowered portions lie.

However, these appliqués are applied directly onto a garment or other substrate material. Thus, these systems do not allow for the creation of independent units which can be later adhered onto another member. Further, the disclosed methods which are employed to create the appliqués on garments or other substrates are not appropriate for creating independent units, but rather can only be used to create the appliqués directly onto the garments themselves.

What is desired, therefore, is a system for retaining and displaying a piece of material, which retains the piece of material within an independent unit so that it may later be adhered to another member, which retains the material securely therein, and which inhibits damage to the material retained therein, such as may be caused by fraying. A method for creating such a system which allows for the simultaneous creation of a plurality of independent units is also desired.

SUMMARY OF THE INVENTION

Accordingly, it is an object of the present invention to provide a system for retaining and displaying a piece of material, which retains the piece of material within an independent unit so that it may later be adhered to another member.

Another object of the present invention is to provide a system for retaining and displaying a piece of material having the above characteristics and which retains the material securely therein.

A further object of the present invention is to provide a system for retaining and displaying a piece of material having the above characteristics and which inhibits damage to the material retained therein, such as may be caused by fraying.

Still another object of the present invention is to provide a method for creating a system for retaining and displaying a piece of material having the above characteristics, and which allows for the simultaneous creation of a plurality of independent units.

These and other objects of the present invention are achieved by provision of a system for retaining and displaying a piece of material which includes a piece of material having an upper surface, a lower surface, and an outer periphery. An intermediate fixation system is attached to the lower surface of the piece of material. The system also includes a lower layer having an outer periphery, an upper surface and a lower surface, with the piece of material being affixed to the upper surface of the lower layer by the intermediate fixation system. The lower layer is sized such that the outer periphery thereof extends beyond the outer periphery of the piece of material. An upper layer having an outer periphery sized such that the outer periphery of the upper layer extends beyond the outer periphery of the piece of material is sealed to the upper surface of the lower layer. The upper layer has an opening passing therethrough which is sized such that a portion of the upper layer surrounding the opening therein overlies and is sealed to the outer periphery of the piece of material on its upper surface. An adhesive layer is applied to the lower surface of the lower layer.

The adhesive layer applied to the lower surface of the lower layer may comprise a pressure sensitive adhesive. When such is the case, it is preferable that the pressure sensitive adhesive layer has a releasable backing layer applied thereto. In one preferred embodiment, the upper layer and the lower layer are formed from vinyl sheet material, and the piece of material comprises a piece of fabric material.

It is preferred that the intermediate fixation system includes an intermediate vinyl sheet layer having an upper surface and a lower surface, with the piece of material being attached to the upper surface. It is also preferable that an adhesive layer be applied to the lower surface of the intermediate vinyl layer, the adhesive layer being adhered to the upper surface of the lower layer. Most preferably, the adhesive layer applied to the lower surface of the intermediate vinyl sheet layer comprises a pressure sensitive adhesive.

A method for creating a system for retaining and displaying a piece of material is also provided. A section of material is first attached to an intermediate fixation system, and then at least one piece of material is cut from the section of material. The at least one piece of material is affixed to an upper surface of a lower layer, the lower layer having an adhesive layer attached to a lower surface thereof. Next, at least one opening is formed in an upper layer, the opening having a size smaller than the size of an outer periphery of the piece of material. The upper layer is then disposed adjacent to the lower layer with the at least one piece of material sandwiched therebetween. The upper layer is positioned with respect to the piece of material so that the portions of the upper layer surrounding the at least one opening overlie the outer periphery of the at least one piece of material. Next, the portions of the upper layer which overlie the outer periphery of the at least one piece of material are sealed to the at least one piece of material, the upper layer is sealed to the lower layer in areas surrounding the outer periphery of the at least one piece of material, and at least one finished system for retaining and displaying a piece of material is cut from surrounding portions of the upper and lower layers.

Preferably, the sealing steps are accomplished by a radio frequency sealing die, and most preferably, the sealing steps and the cutting step are performed simultaneously by such a die. It is also preferable that the step of affixing the at least one piece of material to an upper surface of a lower layer step is accomplished by attaching the at least one piece of material to an upper surface of an intermediate vinyl sheet layer having an adhesive layer applied to a lower surface thereof, and adhering the at least one piece of material to an upper surface of a lower layer with the adhesive layer. Most preferably, the adhesive layer applied to the lower surface of the intermediate vinyl sheet layer is a pressure sensitive adhesive layer having a releasable backing layer applied thereto, and wherein the releasable backing layer is removed before adhering the at least one piece of material to an upper surface of the lower layer with the adhesive layer.

In another embodiment of the inventive method, the at least one opening in the upper layer is not pre-formed. Instead, the opening is formed as part of the sealing/cutting operation.

The invention and its particular features and advantages will become more apparent from the following detailed description considered with reference to the accompanying drawings.

DETAILED DESCRIPTION OF AN EMBODIMENT OF THE INVENTION

Figure 1:
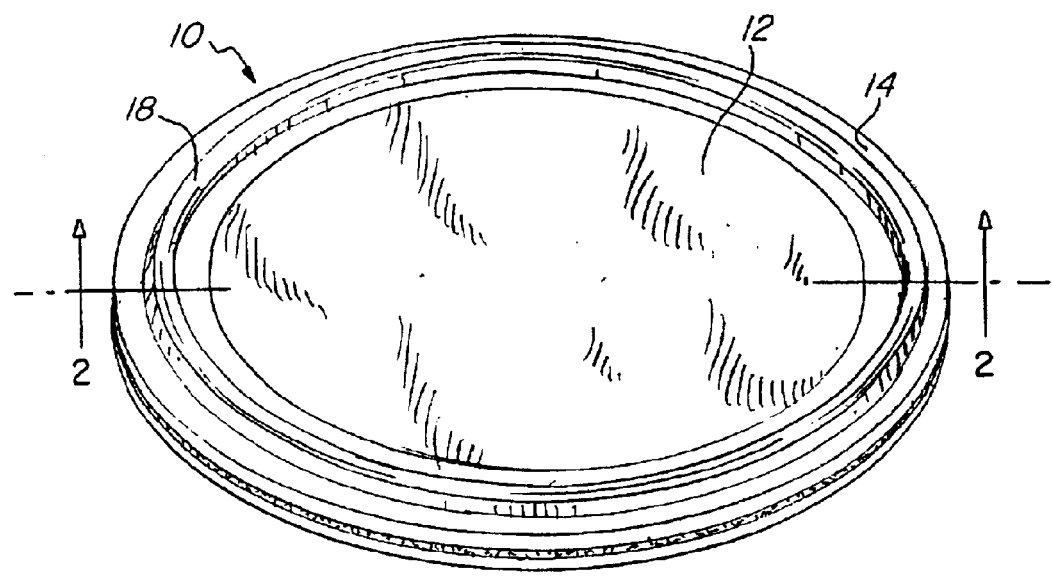
FIG. 1 is an isometric view of a system for retaining and displaying a piece of material in accordance with the present invention.

Referring first to FIG. 1, a system 10 for retaining and displaying a piece of material in accordance with the present invention is shown. The system 10 generally includes a piece of material 12 and a surround 14 which encapsulates the peripheral edges of piece of material 12 and retains it securely therein. The surround includes on a rear face thereof a pressure sensitive adhesive layer 16 so that the system 10 can be adhered to another surface. For example, if piece of material comprises a piece of an athlete's jersey or the like, system 10 may be adhered to a preprinted collectible card (not shown).

It should be understood, however, that piece of material 12 may comprise any of a number of other materials, fabric or non-fabric, such as shorts, tank-tops, and other clothing relating to a professional sports game, scarves, kerchiefs, parts of shoes, fabric from automobile seats, fabric from sports bags, back-packs, and numerous other materials. It should also be understood that piece of material 12 and surround 14 may have any of a number of shapes, such as circles, squares, triangles, ovals, rectangles, etc. It should also be understood that piece of material 12 and surround may have different shapes with respect to each other. For example, piece of material 12 may be circular, while surround 14 may be square. All that is required is that the dimension of the periphery of surround 14 be greater than the dimension of the periphery of piece of material 12 so that piece of material 12 may fit within surround 14.

Surround 14 may also be formed from any of a number of various materials, although it has been found that vinyl sheet material provides excellent results. System 10 may also include an upwardly projecting lip 18 surrounding piece of material 12, which is a byproduct of the shape of the dies used to create system 10 (as explained more fully below), and which may be aesthetically pleasing. Of course, it should be understood that lip 18 is not required.

Figure 2:
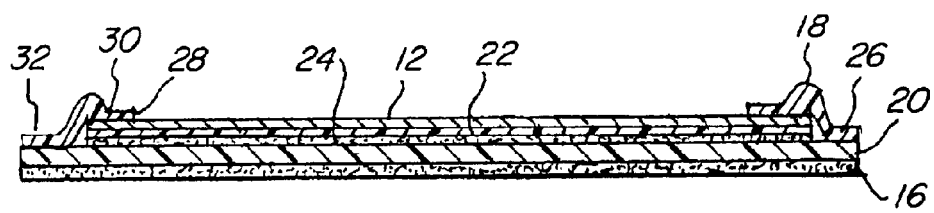
FIG. 2 is a cross-sectional view of the system for retaining and displaying a piece of material taken along line 2—2 of FIG. 1.

Referring now to FIG. 2, the configuration of system 10 is shown in more detail. Surround 14 includes a lower layer 20, preferably but not necessarily formed of vinyl sheet material, to which pressure sensitive adhesive layer 16 is applied. Piece of material 12 is attached to the opposite surface of lower layer 20 by means of an intermediate fixation system. For example, piece of material 12 may be attached to an intermediate vinyl layer 22, which includes on an opposite surface thereof an intermediate pressure sensitive adhesive layer 24 which in turn is adhered to lower layer 20. The purpose of the intermediate fixation system is to (somewhat temporarily) fix piece of material 12 in a proper position on lower layer 20 during assembly, as more fully described below. It should be understood that intermediate fixation system may take forms other than intermediate vinyl layer 22 and intermediate pressure sensitive adhesive layer 24. For example, intermediate fixation system may comprise a transfer adhesive laminated directly onto piece of material 12, thus dispensing with intermediate vinyl layer 22.

An upper layer 26 is provided which has an inner opening 28 passing therethrough, which inner opening is sized and shaped to overlie the outer periphery 30 of piece of material 12. The portion of upper layer 26 which overlies outer periphery 30 of piece of material 12 is sealed thereto by using, for example, radio frequency (RF) sealing, heat sealing, sonic sealing, vibration sealing or the like, as more fully described below. The outer periphery 32 of upper layer 26 is sized and shaped to extend beyond the outer periphery 30 of piece of material 12 such that outer periphery 32 of upper layer 26 contacts, and is sealed to by RF sealing, heat sealing, sonic sealing, vibration sealing or the like, lower layer 20. Upwardly projecting lip 18 surrounding piece of material 12, if provided, is formed in upper layer 26, as explained more fully below.

Thus, piece of material 12 is secured firmly between upper layer 26 and lower layer 20. At the same time, the outer periphery 30 of piece of material 12 is protected from damage (e.g., fraying) by upper layer 26.

Referring now to FIGS. 3–8, a method for creating system 10 in accordance with the present invention is shown. The illustrative example below refers to pieces of material 12 comprising pieces of an athlete's jersey. However, as mentioned above, it should be understood that pieces of material 12 may comprise any of a number of other materials, both fabric or non-fabric.

Figure 3:
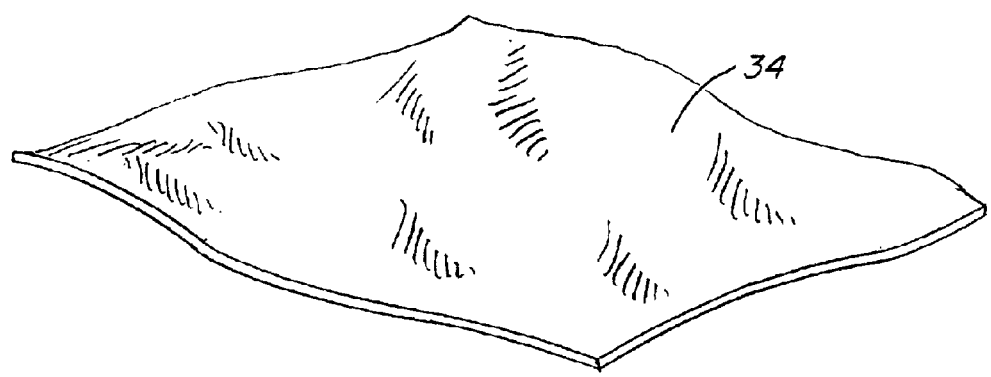
FIGS. 3–8 are isometric views showing various components of the system for retaining and displaying a piece of material of FIG. 1 and illustrating a method for creating such a system.
Figure 4:
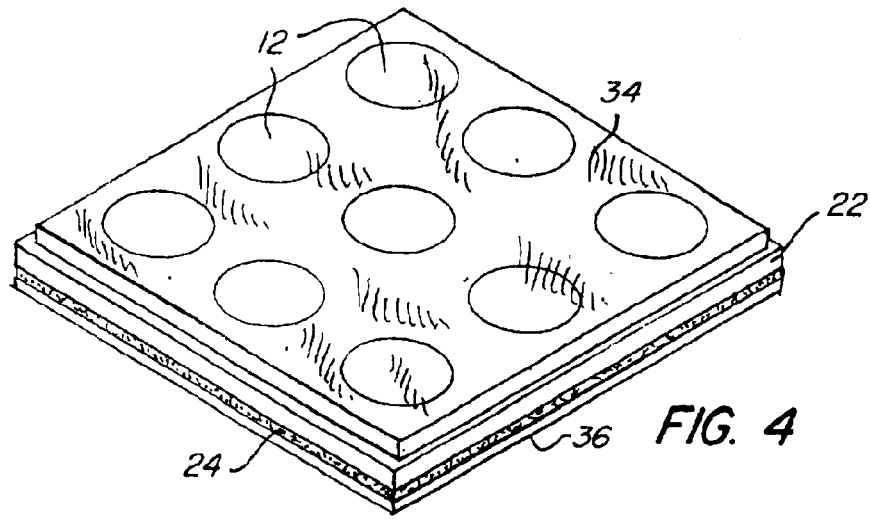

The jersey is first prepared for the encapsulation process. To accomplish this the jersey is cut apart into large sections 34, as shown in FIG. 3. If desirable, side seams and the like may also be undone to get the jersey into an open-flat state. Next, sections 34 of jersey are attached to an intermediate fixation system, as shown in FIG. 4. For example, sections 34 may be attached to an intermediate vinyl layer 22, which includes on an opposite surface thereof an intermediate pressure sensitive adhesive layer 24. It should be understood that intermediate fixation system may take forms other than intermediate vinyl layer 22 and intermediate pressure sensitive adhesive layer 24. For example, intermediate fixation system may comprise a transfer adhesive laminated directly onto section 34, thus dispensing with intermediate vinyl layer 22. Sections 34 can be applied to the intermediate fixation system by means of heat-application or the like. A backing layer 36 may be applied to intermediate pressure sensitive adhesive layer 24 to facilitate handling of section 34 at this point.

Figure 5:
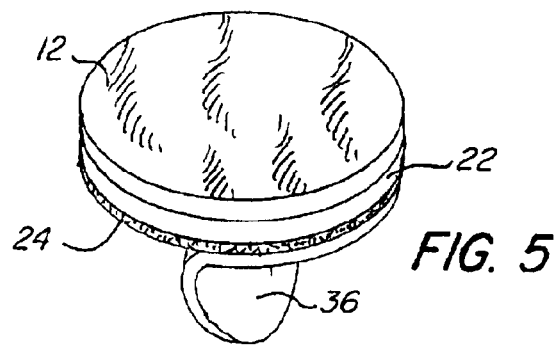
Figure 6:
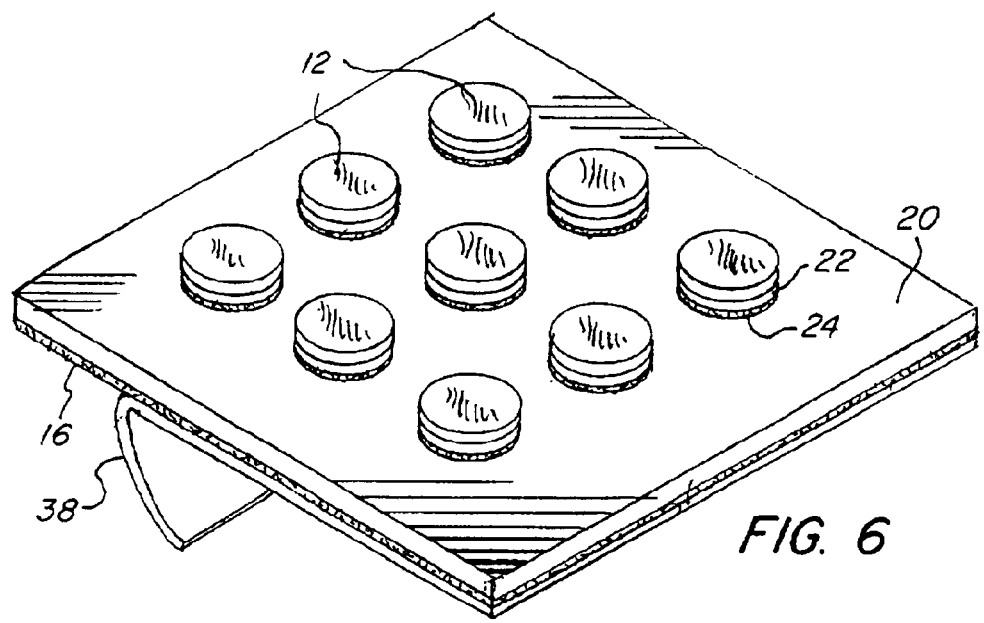
Figure 7:
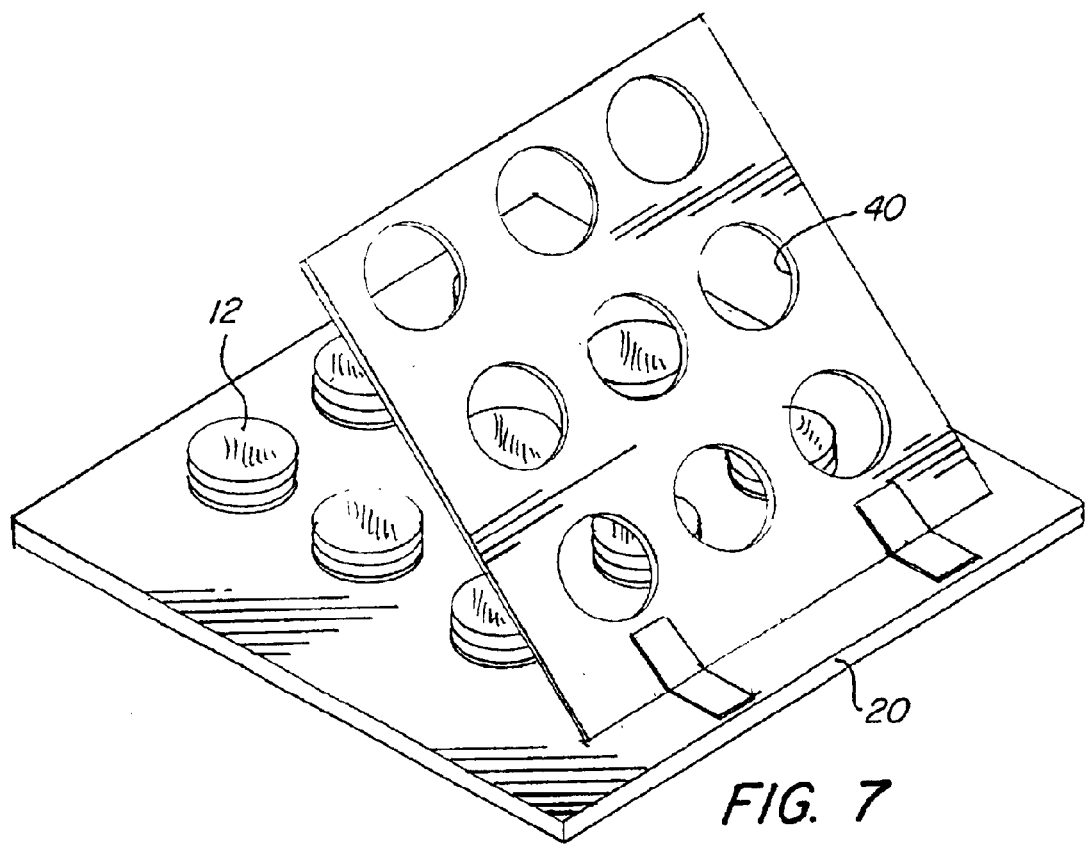

Section 34 is then cut, for example using a die, into individual pieces of material 12 (best seen in FIGS. 4 and 5). The dimensions of the pieces of material 12 are dependent upon the dimensions of the surround 14. If one is using circles for the pieces of material 12 and for the surround 14, for example, then the pieces of material 12 need to be of a size that is smaller than the final size of the surround 14. So, for example, if the final surround 14 is to be 1" in diameter, the pieces of material 12 are cut to be approximately ⅞" in diameter.

The pre-cut pieces of material 12 which now have the intermediate fixation system attached thereto are placed onto lower layer 20. If an intermediate pressure sensitive adhesive layer 24 with a backing layer 36 is employed, backing layer 36 is first removed, as shown in FIG. 5. As discussed above, lower layer 20 has a pressure sensitive adhesive layer 16 applied thereto, which layer 16 may be covered by a backing layer. In order to facilitate proper placement of pieces of material on lower layer 20, a jig 40 may be used having holes therein which line up with projections of the sealing die, as discussed more fully below. For production economics it is desirable to create multiple systems 10 simultaneously. Thus, a plurality of pieces of material 12 may be placed on lower layer 20, and a die for accommodating multiple systems 10 may be employed. For example nine pieces of material 12 are shown per sheet of lower layer 20, but more or less (e.g., six per sheet, twelve per sheet, sixteen per sheet, twenty-five per sheet, etc.) could be used.

Figure 8:
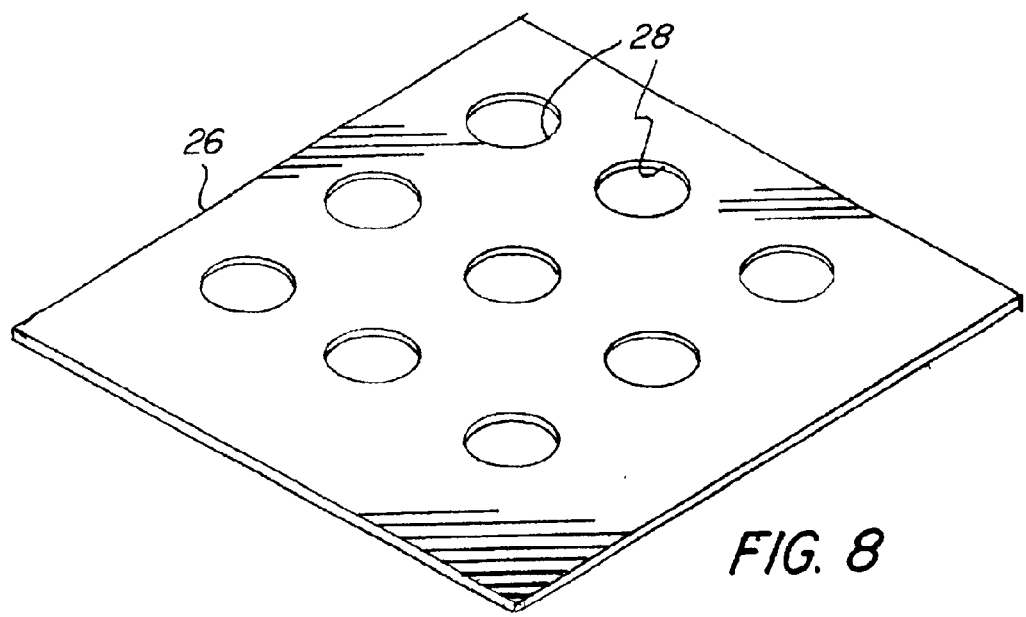

The upper layer 26 is then positioned over the lower layer 20 with the pieces of material 12 therebetween. It is preferable that inner openings 28 passing through upper layer 26 be pre-formed, as shown in FIG. 8, although such is not strictly required. As discussed above, inner openings 28 are sized and shaped to overlie the outer periphery of pieces of material 12.

Figure 9:
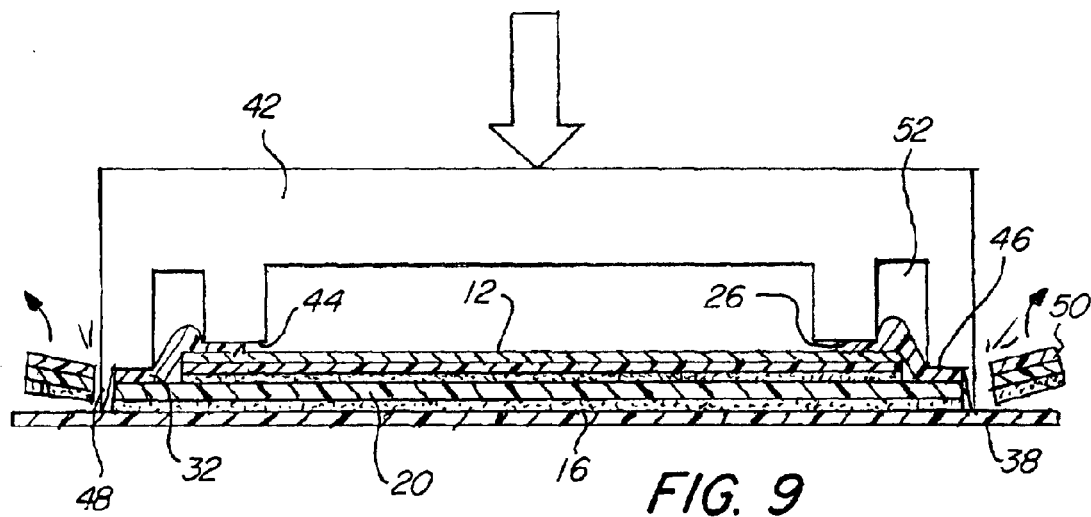
FIG. 9 is a cross-sectional view illustrating a method for creating the system for retaining and displaying a piece of material of FIG. 1.

Referring now to FIG. 9, a final sealing step is shown which is particularly adapted to be employed when inner openings 28 passing through upper layer 26 are pre-formed. A die 42 is used to press down on and seal the portion of upper layer 26 which overlies the outer periphery of piece of material 12 by using, for example, radio frequency (RF) sealing, heat sealing, sonic sealing, vibration sealing or the like. Because inner openings 28 passing through upper layer 26 are pre-formed, the inner downwardly extending portion of die 42 only need have a flat sealing surface 44. Outer periphery 32 of upper layer 26 is sealed to, by RF sealing, heat sealing, sonic sealing, vibration sealing or the like, lower layer 20 by a flat sealing surface 46 provided on an outer downwardly extending portion of die 42.

The outer downwardly extending portion of die 42 further includes a downwardly projecting cutting portion 48, which is sized and shaped to correspond to the desired shape of the outer periphery of surround 14. The cutting portion 48 extends to such a degree that lower layer 20 and pressure sensitive layer 16 are cut through, such that scrap pieces 50 may be separated therefrom. The cutting portion 48 may extend to such a degree that backing layer 38 is also cut through so that individual systems 10 are formed, each having its own backing layer, or may extend to such a degree that backing layer 38 is not cut, so that all of the systems 10 on each sheet stay together on a single backing layer, from which they may be individually removed. Upwardly projecting lip 18 surrounding piece of material 12, if provided, is formed in upper layer 26, by the gap 52 provided between the inner and outer downwardly extending portions of die 42. If no lip 18 is desired, no gap need be provided.

Thus, piece of material 12 is secured firmly between upper layer 26 and lower layer 20. At the same time, the outer periphery 30 of piece of material 12 is protected from damage (e.g., fraying) by upper layer 26.

Figure 10:
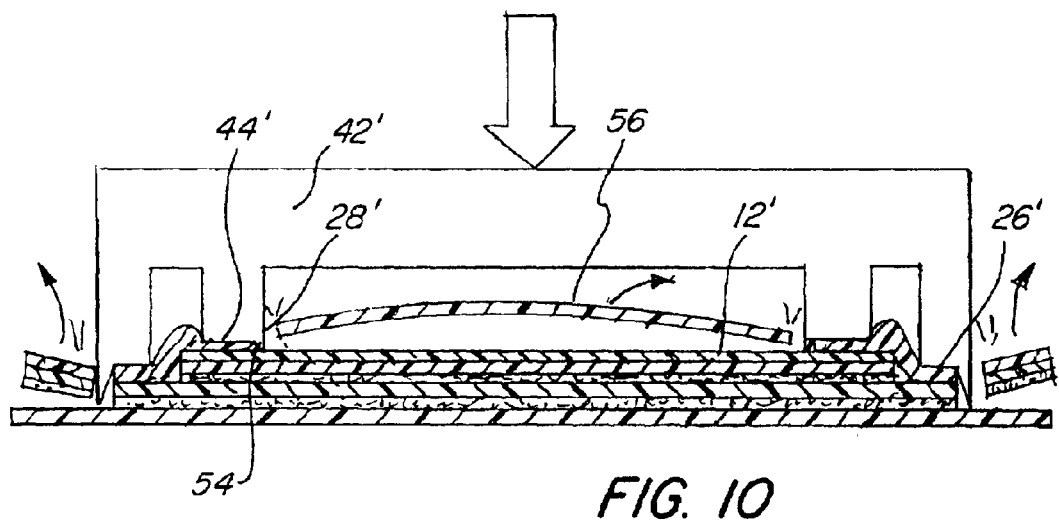
FIG. 10 is a cross-sectional view illustrating a second method for creating the system for retaining and displaying a piece of material of FIG. 1.
Figure 11:
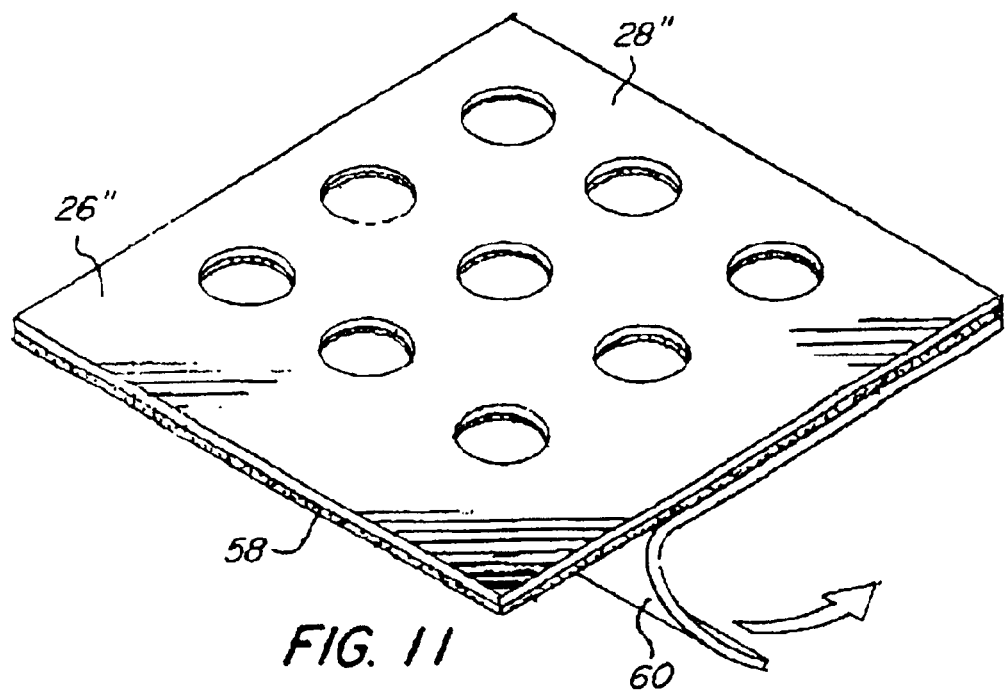
FIGS. 11 and 12 are isometric views illustrating a third method for creating a system for retaining and displaying a piece of material according to the present invention.
Figure 12:
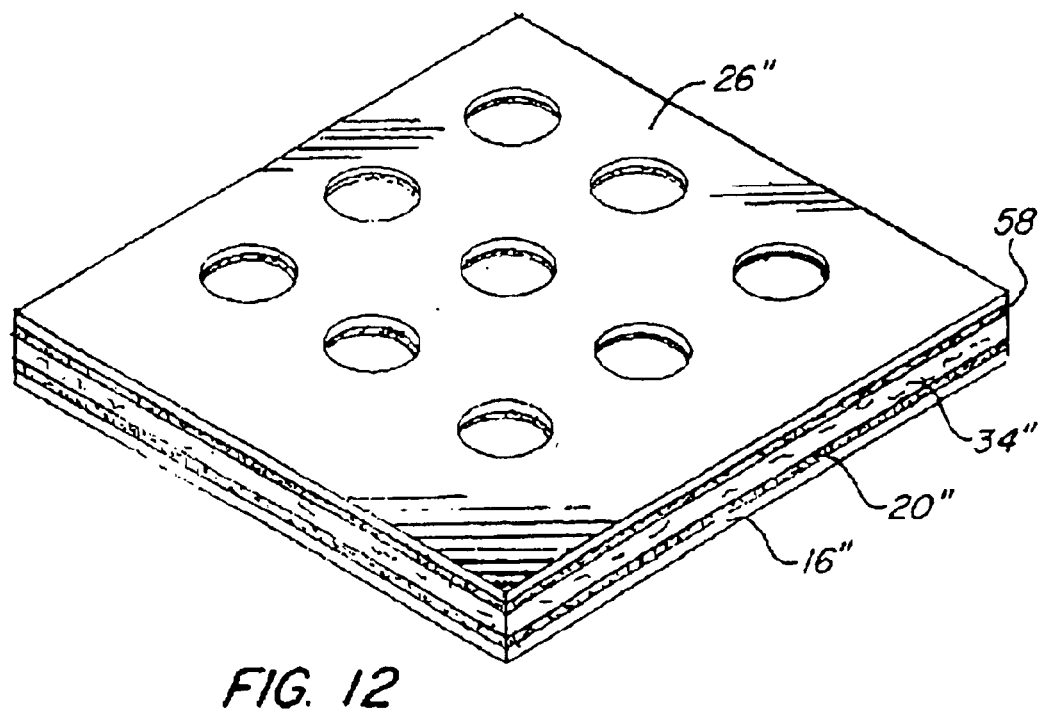
Figure 13:
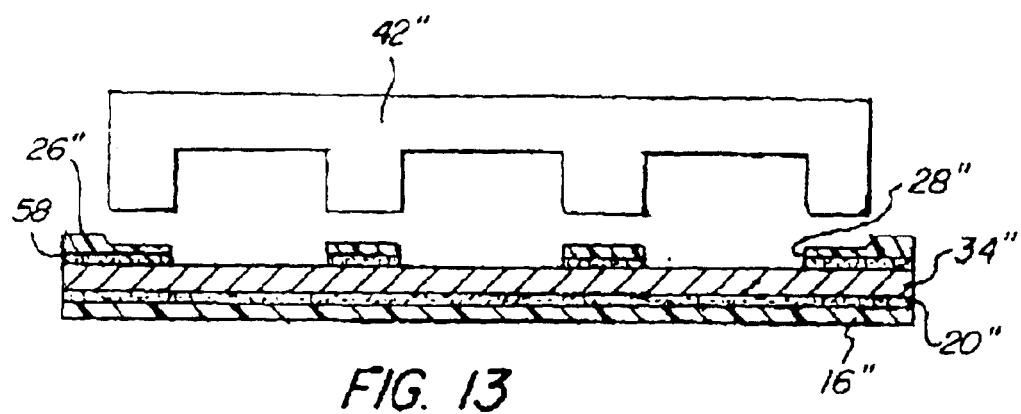
FIGS. 13 and 14 are cross-sectional views further illustrating the method of FIGS. 11 and 12.
Figure 14:
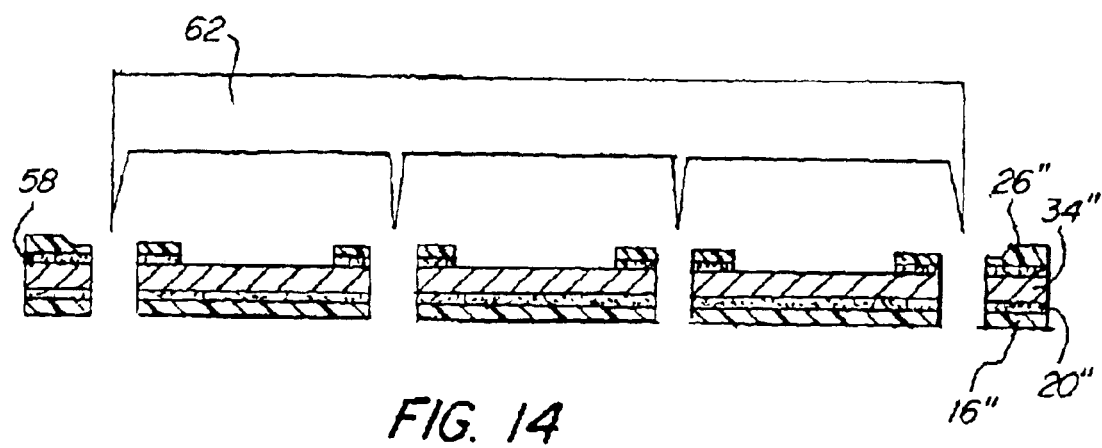

Referring now to FIG. 10, a second embodiment of the inventive method is shown. This embodiment is substantially the same as the embodiment shown in FIG. 6, with the exception that inner openings 28' passing through upper layer 26' are not pre-formed When such is the case, the inner downwardly extending portion of die 42', in addition to flat sealing surface 44', also includes a downwardly projecting cutting portion 54, which is sized and shaped to correspond to the desired shape of the piece of material 12' which is to be displayed. After being cut by cutting portion 54, the cut portion 56 of upper layer 26' can simply be removed.

Referring now to FIGS. 11–14, a third embodiment of the inventive method is shown. In this embodiment, upper layer 26" has a pressure sensitive adhesive layer 58 laminated to its underside, which adhesive layer 58 may be covered by a releasable backing layer 60. In this embodiment, upper layer 26" has pre-formed inner openings 28" passing therethrough, similar to the openings 28 described above with respect to the first-described embodiment.

Releasable backing layer 60 (if provided) is removed from pressure sensitive adhesive layer 58, and upper layer 26" is adhered to a section 34" of jersey or other desired material. Joined upper layer 26" and section 34" of jersey of the like are now placed loosely (i.e., without the need for an intermediate fixation system) over lower layer 20″, which itself has a pressure sensitive adhesive layer 16″ attached to a lower surface thereof.

The sandwiched layers are then sealed, preferably with a radio-frequency (RF) die 42″ or the like, as described more fully above. Preferably, die 42″ is a flat edge die which seals and bonds all of the various layers together, and which extends beyond pre-formed openings 28″ in order to ensure that they are properly sealed to section 34″ of jersey or the like. Next, the sealed sandwiched layers are cut to the final desired size and shape using steel rule die 62, laser, or other cutting method.

The present invention, therefore, provides a system for retaining and displaying a piece of material, which retains the piece of material within an independent unit so that it may later be adhered to another member, which retains the material securely therein, and which inhibits damage to the material retained therein, such as may be caused by fraying. A method for creating such a system which allows for the simultaneous creation of a plurality of independent units is also provided.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for creating a system for retaining and displaying a piece of material, said method comprising the steps of:
    attaching the piece of material to an upper surface of an intermediate vinyl sheet layer having an adhesive layer applied to a lower surface thereof;
    adhering the piece of material to an upper surface of a lower layer with the adhesive layer, the lower layer having an adhesive layer attached to a lower surface thereof;
    providing an upper layer having an opening having a size smaller than the size of an outer periphery of the piece of material;
    disposing the upper layer adjacent to the lower layer with the piece of material sandwiched therebetween, and positioning the upper layer with respect to the piece of material so that the portions of the upper layer surrounding the opening overlie the outer periphery of the piece of material;
    sealing the portions of the upper layer which overlie the outer periphery of the at least one piece of material to the at least one piece of material; and
    sealing the upper layer to the lower layer in areas surrounding the outer periphery of the at least one piece of material.

2. The method of claim 1 further comprising, before said attaching step, the steps of:
    providing a section of material;
    attaching the section of material to an intermediate fixation system; and
    cutting at least one piece of material from the section of material.

3. The method of claim 1 wherein said providing an upper layer step comprises the steps of:
    providing an upper layer; and
    forming an opening in the upper layer having a size smaller than the size of an outer periphery of the piece of material.

4. The method of claim 1 further comprising the step of cutting at least one finished system for retaining and displaying a piece of material from surrounding portions of the upper and lower layers.

5. The method of claim 4 wherein said sealing steps and said cutting at least one finished system step are performed simultaneously by a die.

6. The method of claim 1 wherein said sealing steps are accomplished by a radio frequency sealing die.

7. The method of claim 1 wherein the adhesive layer applied to the lower surface of the intermediate vinyl sheet layer is a pressure sensitive adhesive layer having a releasable backing layer applied thereto, and further comprising the step of removing the releasable backing layer before adhering the at least one piece of material to an upper surface of a lower layer with the adhesive layer.

8. A method for creating a system for retaining and displaying a piece of material, said method comprising the steps of:
    providing a section of material;
    attaching the section of material to an intermediate fixation system;
    cutting at least one piece of material from the section of material;
    attaching the at least one piece of material to an upper surface of an intermediate vinyl sheet layer having an adhesive layer applied to a lower surface thereof;
    adhering the at least one piece of material to an upper surface of a lower layer with the adhesive layer, the lower layer having an adhesive layer attached to a lower surface thereof;
    forming at least one opening in an upper layer, the opening having a size smaller than the size of an outer periphery of the piece of material;
    disposing the upper layer adjacent to the lower layer with the at least one piece of material sandwiched therebetween, and positioning the upper layer with respect to the piece of material so that the portions of the upper layer surrounding the at least one opening overlie the outer periphery of the at least one piece of material;
    sealing the portions of the upper layer which overlie the outer periphery of the at least one piece of material to the at least one piece of material;
    sealing the upper layer to the lower layer in areas surrounding the outer periphery of the at least one piece of material; and
    cutting at least one finished system for retaining and displaying a piece of material from surrounding portions of the upper and lower layers.

9. The method of claim 8 wherein said sealing steps are accomplished by a radio frequency sealing die.

10. The method of claim 8 wherein said seating steps and said cutting at least one finished system step are performed simultaneously by a die.

11. The method of claim 8 wherein the adhesive layer applied to the lower surface of the intermediate vinyl sheet layer is a pressure sensitive adhesive layer having a releasable backing layer applied thereto, and further comprising the step of removing the releasable backing layer before adhering the at least one piece of material to an upper surface of a lower layer with the adhesive layer.

12. A method for creating a system for retaining and displaying a piece of material, said method comprising the steps of:

providing a section of material;

attaching the section of material to an intermediate fixation system;

cutting at least one piece of material from the section of material;

attaching the at least one piece of material to an upper surface of an intermediate vinyl sheet layer having an adhesive layer applied to a lower surface thereof;

adhering the at least one piece of material to an upper surface of a lower layer with the adhesive layer, the lower layer having an adhesive layer attached to a lower surface thereof;

disposing an upper layer adjacent to the lower layer with the at least one piece of material sandwiched therebetween, and positioning the upper layer with respect to the piece of material so that the upper layer overlies the outer periphery of the at least one piece of material;

sealing a portion of the upper layer which overlies the outer periphery of the at least one piece of material to the at feast one piece of material;

cutting an opening in an upper layer within the portion sealed to the piece of material, the opening having a size smaller than the size of the outer periphery of the piece of material;

sealing the upper layer to the lower layer in areas surrounding the outer periphery of the at least one piece of material; and cutting at least one finished system for retaining and displaying a piece of material from surrounding portions of the upper and lower layers.

13. The method of claim 12 wherein said sealing steps are accomplished by a radio frequency sealing die.

14. The method of claim 12 wherein said sealing steps and said cutting an opening and said cutting at least one finished system steps are performed simultaneously by a die.

15. The method of claim 12 wherein the adhesive layer applied to the lower surface of the intermediate vinyl sheet layer is a pressure sensitive adhesive layer having a releasable backing layer applied thereto, and further comprising the step of removing the releasable backing layer before adhering the at least one piece of material to an upper surface of a lower layer with the adhesive layer.

* * * * *